(12) United States Patent
Blume

(10) Patent No.: US 7,481,027 B2
(45) Date of Patent: Jan. 27, 2009

(54) BILEVEL BICYCLE STORAGE SYSTEM

(76) Inventor: Ernst Blume, Schucker Str. 18, 48153 Münster (DE)

( * ) Notice: Subject to any disclaimer, the term of this patent is extended or adjusted under 35 U.S.C. 154(b) by 47 days.

(21) Appl. No.: 11/646,005

(22) Filed: Dec. 27, 2006

(65) Prior Publication Data

US 2007/0107322 A1   May 17, 2007

Related U.S. Application Data

(63) Continuation-in-part of application No. 11/001,935, filed on Dec. 2, 2004.

(51) Int. Cl.
| | |
|---|---|
| E04H 1/00 | (2006.01) |
| E04H 3/00 | (2006.01) |
| E04H 5/00 | (2006.01) |
| E04H 6/00 | (2006.01) |
| E04H 9/00 | (2006.01) |
| E04H 14/00 | (2006.01) |
| A47F 7/00 | (2006.01) |

(52) U.S. Cl. .......................................... 52/79.1; 211/17
(58) Field of Classification Search ..................... 52/64, 52/122.1; 211/17, 20, 23, 85.8, 1.51; 411/537, 411/538
See application file for complete search history.

(56) References Cited

U.S. PATENT DOCUMENTS

| | | | | | |
|---|---|---|---|---|---|
| 3,883,002 | A | * | 5/1975 | Moore | ........................ 211/18 |
| 3,907,113 | A | * | 9/1975 | Kropelnitski | ................. 211/19 |
| 5,199,843 | A | * | 4/1993 | Sferra | ........................ 414/592 |
| 6,161,702 | A | * | 12/2000 | Campbell | ..................... 211/17 |
| 6,237,781 | B1 | * | 5/2001 | Dahl | ............................. 211/17 |
| 6,637,602 | B2 | * | 10/2003 | Dueck | .......................... 211/17 |
| 6,729,478 | B1 | * | 5/2004 | Boers | ........................... 211/18 |
| 7,150,449 | B1 | * | 12/2006 | Dueck et al. | ................ 254/278 |

\* cited by examiner

*Primary Examiner*—Brian E. Glessner
*Assistant Examiner*—Christopher J Darner
(74) *Attorney, Agent, or Firm*—Timothy M. Barlow

(57) ABSTRACT

A multiple-level bicycle storing system includes a framework having a vertical support and a horizontal mounting frame. The framework defines a lower storing space with a lower receiver, a middle storing space with an upper receiver attached to the mounting frame with a pivot mechanism, and an upper storing space. The upper storing space includes an upper track having a horizontal rail, a shuttle movably engaging the rail, an electric shuttle motor attached to the rail and the shuttle and a power source, a cable winch incorporated into the shuttle, an electric winch motor attached to the cable winch and the power source, a control box attached between the winch motor, the shuttle motor and the power source, and a bicycle support attached to the cable winch. The pivot mechanism includes a plurality of rollers, rails, a lever and a gas spring to enable extension of the upper receiver.

2 Claims, 18 Drawing Sheets

BILEVEL BICYCLE STORAGE SYSTEM

This application is a continuation in part of U.S. patent application Ser. No. 11/001,935, entitled Bilevel Bicycle Storage System, filed on Dec. 2, 2004, and which is hereby incorporated by reference.

BACKGROUND OF THE INVENTION

1. Field of the Invention

The present invention pertains to storage systems for bicycles. More specifically, the present invention pertains to a multiple-level storing system for bicycles.

2. Description of the Prior Art

Bicycles are becoming more prevalent in many places. However, it is often difficult to find a safe or appropriate place to park the bike once you have arrived at your destination. Many different bike racks and similar devices have been developed to solve these issues, but these solutions are incomplete at best.

For example, arrays of a large number of exposed racks or rails have been implemented for many years. However, the bikes parked in these arrays are exposed to the elements and can contact each other, causing damage to the bikes. Other systems provide an individual storage box for each bike. However, these boxes are often leased to a particular user, and no one else can access them. Further, there are often not nearly enough boxes available usually because they take up too much space. Existing designs are bulky and are tall enough to accommodate only one bike. There is no provision for safely stacking bicycles in these enclosures.

Thus, it is desired that a multiple-level bicycle parking system be created, to provide more efficient use of space for parking bicycles. Further, a mechanism to raise and lower the bicycles to the multiple upper storage levels is desired, such a system requiring zero or minimal effort by the user. Further, it is desired that such bicycle parking spaces be open to all consumers, who will pay for the parking spaces based upon the amount of time they park there. Such a system should accept cash or noncash payments.

SUMMARY OF THE INVENTION

The device is a modular, three-level parking system for bicycles. The parking spaces include mechanisms that enable the user to easily insert and remove bicycles into the upper parking levels. To accommodate the second level of bicycles, the device includes a movable upper receiver which is pivotally attached to a support frame. The pivoting upper guide bar enables simple loading or unloading of bicycles. It is drawn toward the customer from its horizontal, upper storing position and then angled downward so that the proximal end of the upper receiver is lowered toward the floor. The bicycle can then be easily secured onto or removed from the upper receiver. When it is extended and angled downward, the upper receiver is at least partially supported by a pneumatic spring or other comparable mechanism. A less complex lower receiver accommodates a bike in the lower parking space. The lower receiver is less complex because no lifting or lowering mechanism is required. The upper receiver is shifted or slid over the support frame so that the upper receiver protrudes into the customer's area of movement only during the loading and unloading procedure.

A third bicycle storage level is arranged above the second level. The third level uses a cable-lift system that attaches to a bicycle and pulls it up above the second level. The cable-lift mechanism is incorporated into a support beam that is itself suspended from a track. The track permits the slid into a position directly above the first and second levels to maximize the efficient use of space. This arrangement enables three layers of bicycles to be stored one on top of another in a space-saving manner. A mechanism similar to the third level can be used to create fourth and subsequent levels depending upon the needs to the users and the space parameters within a building or structure.

The stored bicycles are protected in three different ways: firstly against theft, secondly against accidental or intentional damages, and thirdly against weather conditions. A separate structure or a storage system within an existing building is usually provided for the storage system. The storage system—similar to automobile parking garages under surveillance—is run by a minimal number of personnel. Thus a parking fee is charged for storing a bicycle in such a storing system. The three above-mentioned types of protection are attained by the structure that houses the storing system and the personnel. Of course, buildings must be present in which such a storing system can be constructed, or open areas have to be available where a building for housing such a storing system can be constructed.

The enclosure may be locked to provide reliable protection against theft. The system uses standard, automatic locks to facilitate operating the system with a minimum number of personnel. Suitable lock-pay systems are already known in regard to lockers. The use of a door with such a lock enables the use of readily-available standard components, which can be significantly more economical than using special lock or bolt components. Locking doors eliminate the need to lock the bicycle to the upper receiver.

It is not necessary to construct a building or dedicated structure to house the storing system, because the storing system provides box-type enclosures for each storing space. The disclosed storing system can thus be erected at any location with sufficient free space. Thus the number of locations in which such a storing system could be erected is increased when compared to systems or locations requiring a separate, dedicated building to house a storing system.

Because a separate building to house the storing system is not necessary, the time required from planning to set-up of the storing system is significantly shorter. This system can be set up very quickly. For the previously-mentioned reasons and others, comprehensive protection of a bicycle is provided. The design is economically favorable and operation of the system provides a competitive advantage over previous systems.

In operating the second level, in one embodiment the vertical raising and lowering movement of the upper receiver is carried out on a pivot point. The pivot point is the tension pulley axle that the front guide roller is mounted on. In the preferred embodiment, the pivot point operates as close to the front opening of the enclosure as possible in order to ensure that the upper receiver extends outside of the enclosure and does not collide with the lower enclosure and the lower storing space. In case the storing system is open and exposed, without enclosures, the pivot point of the upper receiver can, in contrast, be well inside and away from the front of the lower receiver, because the highest point of a bicycle stored underneath is the saddle. Thus the pivot point of the upper receiver can, for example, be directly above the saddle of the lower bicycle. In this example, the pivoted upper receiver, which is tilted downwards in its loading and unloading position, will not interfere with the rear wheel or rack of the bicycle stored below. Compared to this alternative construction, the pivot point of the enclosed upper receiver is, according to the invention, shifted to the front edge of the enclosure so that the lowered upper receiver clears the closed door of the lower enclosure.

The movement of the pivot point and the upper receiver is provided for by an upper mounting frame, on which the upper receiver is moved. The movable upper receiver, on which the bicycle is secured and which has its pivoting point on the mounting frame, can be moved to the front edge of the enclosure adjacent to the mounting frame and lowered for loading and unloading.

Alternatively, the upper receiver can be fixed to the mounting frame at the pivot bearing. Here, the mounting frame is horizontally extendible. In order to move the pivot point of the upper receiver, the upper receiver is moved together with the mounting frame. This enables the upper receiver to be moved toward the front of the enclosure together with the mounting frame until the pivot point is near the front edge of the enclosure.

A bicycle can be secured into the upper receiver by a wheel bail, or similar mechanism, so that it cannot be moved. The wheel bail is movable so that it reliably rests against one of the wheels of the bicycle due to its own elasticity or its movable, spring-loaded mechanism. In this manner the wheel bail controls the bicycle even when the bicycle is moved on the upper receiver. A wheel lock is provided on the upper receiver in order to limit movement. The wheel lock holds the other wheel of the bicycle in place.

The wheel bail's elasticity and spring mechanism ensures that bicycles of various sizes with various dimensions between axles or different wheel sizes can be secured reliably. The elasticity of the wheel bail provides tolerance compensation and ensures that the wheel bail always rests against the wheel of the secured bicycle in the correct manner The wheel bail is provided at the distal end of the upper receiver and away from the customer so that it is not in the way when loading or unloading the bicycle and so that the bicycle can be mounted without demounting the system. The wheel lock can be constructed as a comparably small protrusion from the upper receiver. The bicycle to be secured can easily run over or be lifted over the wheel lock when loading or unloading the bicycle.

This is especially advantageous when the upper receiver is supported or counterbalanced by a spring. This spring support ensures that the spring is taut when the lowered upper receiver is in the loading and unloading position. Release of tension from the spring assists the customer on lifting the upper receiver to the horizontal storing position. In this manner the customer does not have to lift the complete weight of the bicycle and upper receiver when the upper receiver and the bicycle are lifted from the downwards-tilting loading and unloading position and to the horizontal storing position.

Support for the upper receiver can also be provided by a motor, especially an electric motor. The electric motor can operate the upper receiver by means of a gear mechanism, cable or chain so that the upper receiver is lifted into or lowered from its horizontal position. The use of a motor can ensure that the support almost or completely compensates for the weight of the upper receiver, with or without a bicycle, so that the customer does not need to exert himself to lift or lower the bicycle and upper receiver.

The space required for storage spaces with separate enclosures is larger than the space required by the optimum "packing density" of unprotected and unseparated bicycles stored next to each other. According to the invention, it is thus provided that the storing system with separate enclosures for each bicycle is to be combined with some open storage spaces without enclosures and to which the upper and lower receivers are arranged closer to each other than is the case where frames are employed. Thus, a larger number of bicycles can be stored in the same storing system, especially when the closely situated receivers are arranged in staggered heights to minimize or eliminate collisions between those bicycles. These storage systems without enclosures can, for example, be operated using appropriate automatic locking devices to secure each storing space until payment is received. Alternatively, payment may be completely inapplicable when municipal facilities offer free parking spaces in order to bring order to bicycle storage in designated areas.

One object of the invention is to provide secure, reliable protection for bicycles in a storing system run as economically as possible.

Another object of the invention is to teach a multiple-level storage system for bicycles.

Another object of the invention is to teach a multiple-level storage system for bicycles that includes a mechanism for loading and unloading a bicycle.

Another object of the invention is to teach a multiple-level storage system for bicycles that is modular.

Another object of the invention is to teach a multiple-level storage system for bicycles that provides protection against the weather.

Another object of the invention is to teach a multiple-level storage system for bicycles that provides protection against theft.

Another object of the invention is to teach a multiple-level storage system for bicycles that provides protection against accidental or intentional damages.

Another object of the invention is to teach a multiple-level storage system for bicycles where a bicycle storing space may be rented on a regular or irregular basis.

Another object of the invention is to teach a multiple-level storage system for bicycles that securely locks a bicycle until the owner claims it.

Another object of the invention is to teach a multiple-level storage system for bicycles that securely locks a bicycle until rent payment is received for the storage space.

Another object of the invention is to teach a multiple-level storage system for bicycles that is automated.

Another object of the invention is to teach a multiple-level storage system for bicycles that monitors its lock, payment and security systems.

Another object of the invention is to teach a multiple-level storage system for bicycles that requires a minimum number of personnel to operate.

Finally, it is an object of the present invention to accomplish the foregoing objectives in a simple and cost effective manner.

In the following section the invention is described in an exemplary manner according to extremely simplified, schematic drawings which are not drawn to scale.

DETAILED DESCRIPTION OF THE PREFERRED EMBODIMENTS

Figure 1:
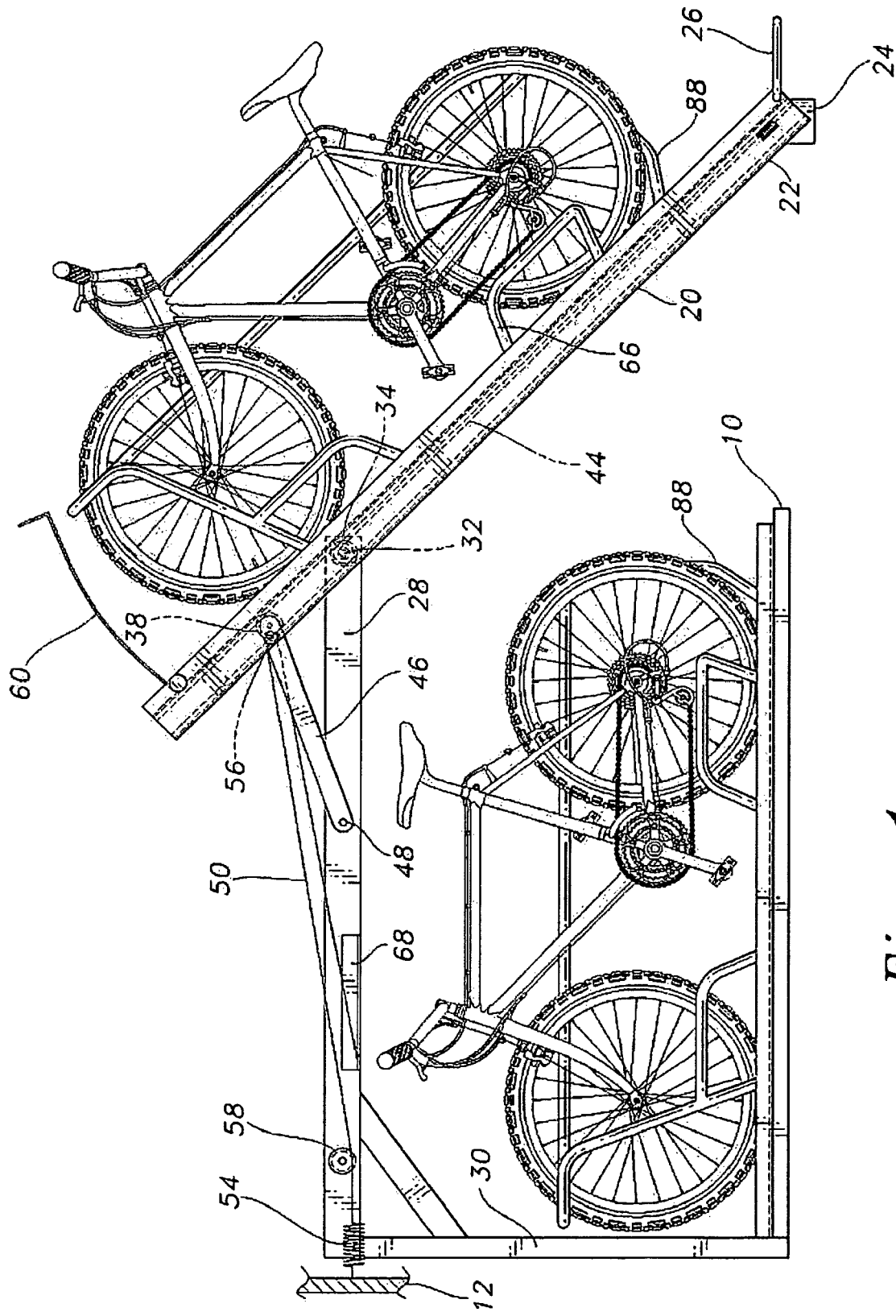
FIG. 1 shows a side view of a Bilevel Bicycle Storage System in the loading and unloading position, according to the invention.

FIG. 1 shows a side view of the Bilevel Bicycle Storage System, herein referred to as the Doubleparker. The Doubleparker has enough space to store two bicycles, one above the other. A lower receiver 10 is fixed to the floor within an enclosure 12enclosure 12. The enclosure 12 has an upper door 14 and a lower door 16 attached with hinges to the front of the enclosure 12, see FIG. 8. The enclosure 12 has generally level upper floor panel 18 (see FIGS. 9 and 10) which separates the storing spaces from each other and also prevents water and soil from the upper storing space from dripping down onto the bicycle stored below. In another embodiment, the pair of storing spaces do not have a joint enclosure 12, but each storing space is contained within its own enclosure, which can be stacked and secured on top of each other.

An upper receiver 20, which is shown it loading and unloading position in FIG. 1, is provided for in the upper level of the Doubleparker. For loading and unloading a bicycle the upper receiver 20 is pulled out of the enclosure 12 and tilted downward so that the proximal end 22 of the upper receiver 20 is directed to the floor. A foot 24 is arranged below the proximal end 5 to prevent damage to the upper receiver 20 or the floor when the upper receiver 20 is lowered.

In FIG. 1 a bicycle is shown secured into the upper receiver 20. In this position the upper receiver 20 is easily lifted with a handle 26. The upper receiver 20 is raised into a generally horizontal position to insert the upper receiver 20 into the enclosure 12. In this manner the enclosure 12 can be secured and two bicycles stored, loaded and unloaded on top of each other in the enclosure 12.

Figure 2:
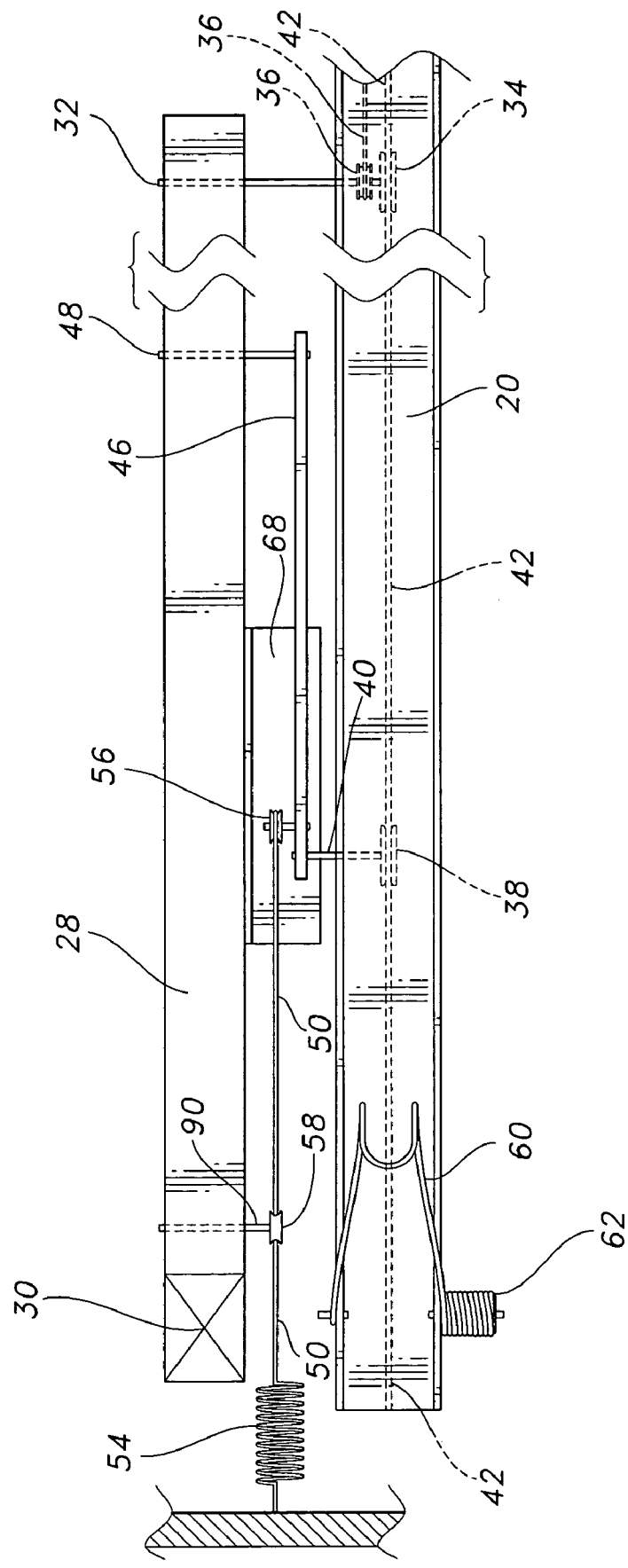
FIG. 2 shows a top view of the upper receiver mechanism of the Bilevel Bicycle Storage System, according to the invention.

FIG. 2 shows a top view of the upper receiver 20. Components within the upper receiver 20 are also visible through the upper receiver. A mounting frame 28 is provided to connect to the upper receiver 20, whereby the mounting frame 28 is fixed to a vertical support 30 which is attached to the floor. In another embodiment, the upper floor 18 between the two storing spaces can serve as a support for the mounting frame 28 instead of the vertical support 30. In this case the upper floor 18 would be fixed to the enclosure 12.

A tension pulley axle 32 is positioned horizontally on the proximal end of the mounting frame 28, upon which a front guide roller 34 and a tension pulley 36 are mounted. The proximal end of the mounting frame 28 is the end closest to the front of the enclosure 12 and the doors 14, 16. A rear guide roller 38 is mounted on a rear guide roller axle 40 which in turn is horizontally attached near the midpoint of the mounting frame 28. The upper receiver 20 travels forward and back on the rear guide roller 40 and front guide roller 34. The guide rollers 34, 40 engage a pair of guide rails 42 inside the top and bottom walls of the upper receiver 20. In FIG. 2 one guide rail 42 is represented by the dashed line parallel to the longitudinal axis of the upper receiver 20.

The tension pulley 36 is mounted on the tension pulley axle 32 next to the front guide roller 34. A retraction cable 44 is wound around the tension pulley 36 and the free end of the retraction cable 44 is attached inside the upper receiver 20 at the proximal end 22. A tension pulley spring (not shown) is attached to the tension pulley 36 and the tension pulley axle 32 and acts to wind the retraction cable 44 onto the tension pulley 36. The tension pulley spring may be integrated into the tension pulley 36 so that they are a single unit, or they may be separate pieces.

When the upper receiver 20 is pulled out of the enclosure 12, then the retraction cable 44 is pulled taut against the tension pulley spring. Thus, sufficient tension is available to assist the user in inserting the upper receiver 20 into the enclosure 12.

In other embodiments, the tension pulley 36 and spring are mounted to the enclosure 12 or other suitable support inside the enclosure 12. Alternatively, the tension pulley 36 and spring may be mounted to the upper receiver 20 with the pulley 36 located near the midpoint of the cable 44. The two free ends of the retraction cable 44 are fixed to the proximal end 22 of the upper receiver 20 and an immovable position that is beyond the distal end of the upper receiver 20 when the upper receiver is fully retracted.

A pivot link 46, shown as a flat bar, is arranged between the mounting frame 28 and the upper receiver 20. One end of the pivot link 46 is connected to the mounting frame 28 by a pivot shaft 48. The guide roller axle 40 is attached to the other end of the pivot link 46. The rear guide roller 38 is mounted to the guide roller axle 40. The upper receiver 20 moves parallel to its longitudinal axis and along the pivot link 46 by the rear guide roller 38. The pivot link 46 serves to guide the upper receiver 20 longitudinally and secures it against excessive lateral motion.

The pivot link 46 also aids in lifting the upper receiver 20. A tag line 50 runs from a tag anchor 52 on the mounting frame 28 to a levelling spring 54 attached to the enclosure 12 or another fixed location near the distal end of the mounting frame 28. In between the levelling spring 54 and the tag anchor 52, the tag line 50 is routed around a deflection pulley 56, mounted to the pivot link 46 opposite the pivot shaft 48, and an idler pulley 58 mounted to the mounting frame 28. When the upper receiver 20 is pulled out of the enclosure 12 and the proximal end 22 is lowered, the pivot link 46 pivots clockwise around the pivot shaft 48. The displacement of the pivot link 46 pulls the tag line 50 tight against the levelling spring 54. In this manner, a restoring force is created, which helps lift the upper receiver 20 to horizontal, whether unloaded or loaded with a bicycle.

The amount of support to the upper receiver 20 is easily adjusted by varying the strength or preload of the tension pulley spring and the levelling spring 54. This can be accomplished by the manufacturer or user. Multiple springs may be used in either or both positions if needed to provide an appropriate tension.

Figure 3B:
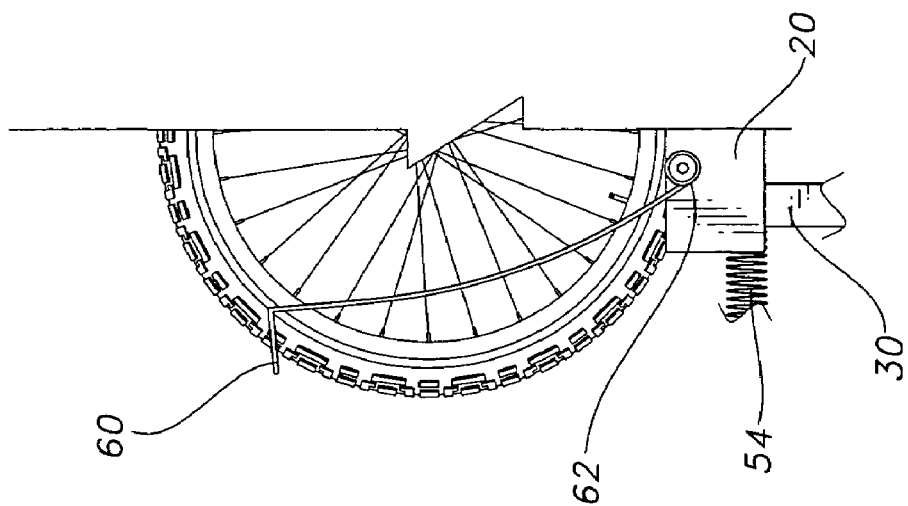
FIG. 3 shows a side view of the wheel bail of the Bilevel Bicycle Storage System, according to the invention.
Figure 3A:
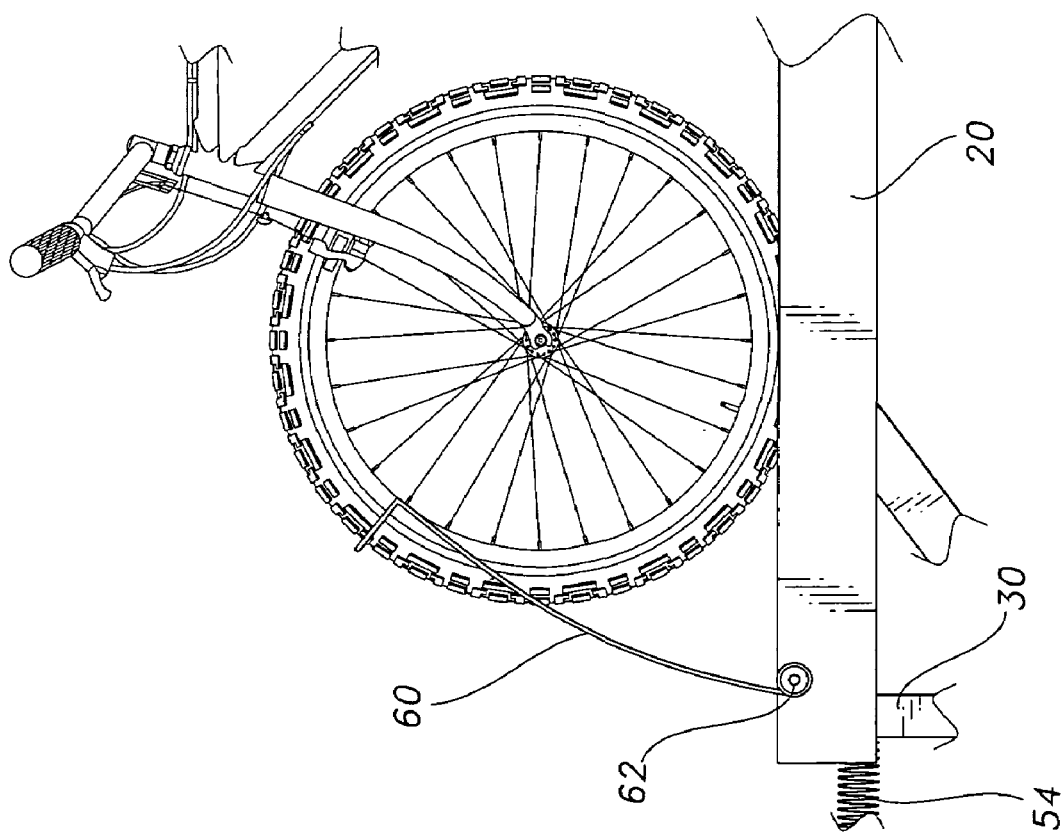

Bicycles are usually loaded and secured into the receivers 10, 20 in the travelling direction so that the front wheels of both bicycles in FIG. 1 are both arranged to the left, farthest into the enclosure 12. A wheel bail 60 is pivotally attached to the upper receiver 20 to hold the front wheel of the bicycle straight. The wheel bail 60 is biased by a bail spring 62 as shown in FIGS. 1 and 3 and thus rests against the front wheel of the bicycle secured in the upper receiver 20. The spring-mounted and flexible nature of the wheel bail 60 enables it to adjust to and partially encompass the bicycle wheel. In FIG. 2, the wheel is shown in cross-section. The wheel bail 60 can be constructed out of a plate stock or out of a wire material, whereby it can exhibit material-based elasticity. The wheel bail 60 can thus be pivoted about its root against in order to adapt to various diameters of bicycle wheels or to adapt to various overall bicycle lengths.

FIG. 3 shows the interaction of the wheel bail 60 with a bicycle wheel. FIG. 3 shows the wheel bail 60 in two different positions. It can take on these two positions and an infinite number of intermediate positions in adjusting itself to the dimensions of various bicycles. The bicycle can be pushed as far as a bail limiter (not shown) when storing a bicycle in the upper receiver 20, as shown in the position to the right of the wheel bail 60 in FIG. 3. The bicycle is automatically returned to the proximal end 22 of the upper receiver 20 due to the spring tension on the wheel bail 60 until the rear wheel of the bicycle rests against the wheel lock 78, explained below. This equilibrium position of the wheel bail 60 is represented by the position to the left in FIG. 3.

The upper receiver 20 has a channel built into its upper surface. The channel has a u-shaped or v-shaped cross-section to guide the wheels of the bicycle along the upper receiver 20. Two side flanks 66 are attached near the proximal end 22 of the upper receiver 20, see FIG. 1. These flanks 66 can be made from bar stock to form an open support framework or out of metal as complete sheets to form a wall. The flanks 66 enable the extremely reliable positioning and retention of the rear wheel in the upper receiver 20. The wheel bail 60 ensures that the rear wheel is located in the area of the flanks 66. As described earlier, the wheel bail 60 presses the bicycle toward the proximal end 22 of the upper receiver 20 and the flanks 66.

In the area of the proximal end 22 of the upper receiver 20 a wheel lock 78 is shown. The wheel lock 78 captures the bicycle wheel at the proximal end 22 of the upper receiver 20. As shown the wheel lock 78 is in the form of a cross-beam, which stretches across the channel atop the upper receiver 20 and against the spokes of the bicycle wheel. The low level of the wheel lock 78 above the upper receiver 20 aids in securing the bicycle in the upper receiver 20, and also ensures that the bicycle is close to the proximal end 22 of the upper receiver 20

An additional security feature is effected by slots or apertures through the flanks 66, through which a U-lock or a chain lock can be threaded. This provides protection against theft and safely fixes the bicycle in the upper receiver 20. The necessary slots or apertures are readily evident, especially when flanks 66 are made of curved round bar stock.

Figure 5:
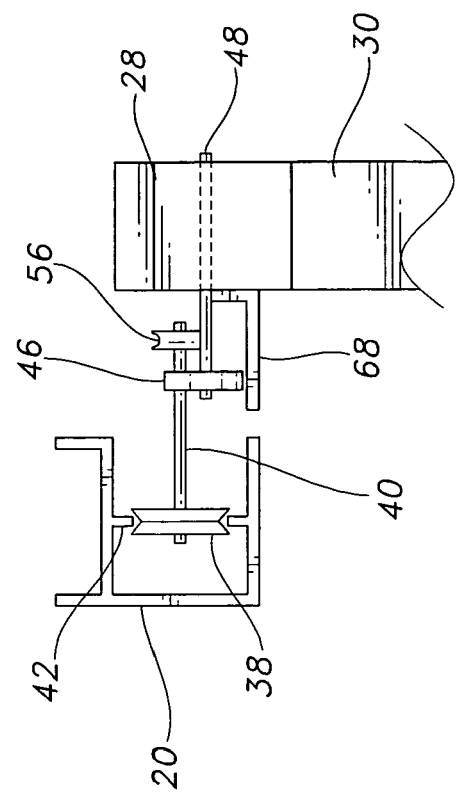
FIG. 5 shows a detailed distal end view of the upper receiver, mounting frame and pivot mechanism for the Bilevel Bicycle Storage System, according to the present invention.

FIG. 5 shows a cross-section of the upper receiver 20 and pivoting mechanism lying flat in the storing position. The rear guide roller 38 is mounted on the guide roller axle 40, which extends from the pivot link 46 to the inside of the upper receiver 20. The groove-shaped U or V section of the upper receiver 20 is easily seen. The pivot link 46 is rotatably attached to the mounting frame 28 by the pivot shaft 48. The deflection pulley 56 can be seen behind the pivot shaft 48 in FIG. 5. The deflection pulley 56 is located behind the pivot shaft 48 in FIG. 5.

Figure 4:
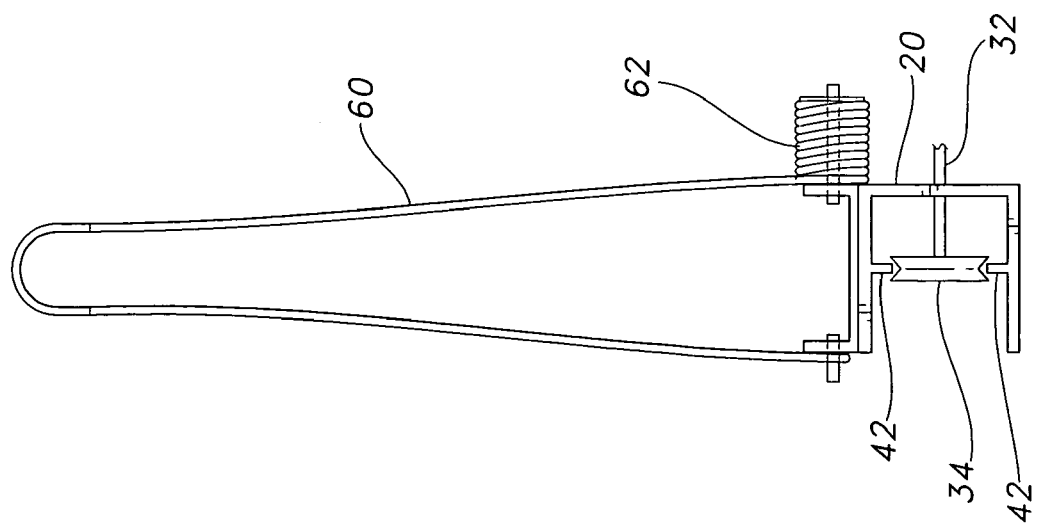
FIG. 4 shows a distal end view of the upper receiver and mounting frame for the Bilevel Bicycle Storage System, according to the present invention.

In FIG. 4 it is shown that the box profile of the upper receiver 20 can be open to the side opposite from the mounting frame 28. FIG. 4 shows that the bail spring 62 has a direct effect on the wheel bail 60. In one embodiment the bail spring 62 is offset from the root or pivot point of the wheel bail 60, closer to the proximal end 22 of the upper receiver 20, so that the wheel bail 60 is forced into a position resting against the bicycle. In another embodiment, the bail spring 62 is generally concentric with the root or pivot point of the wheel bail 60.

Figure 6:
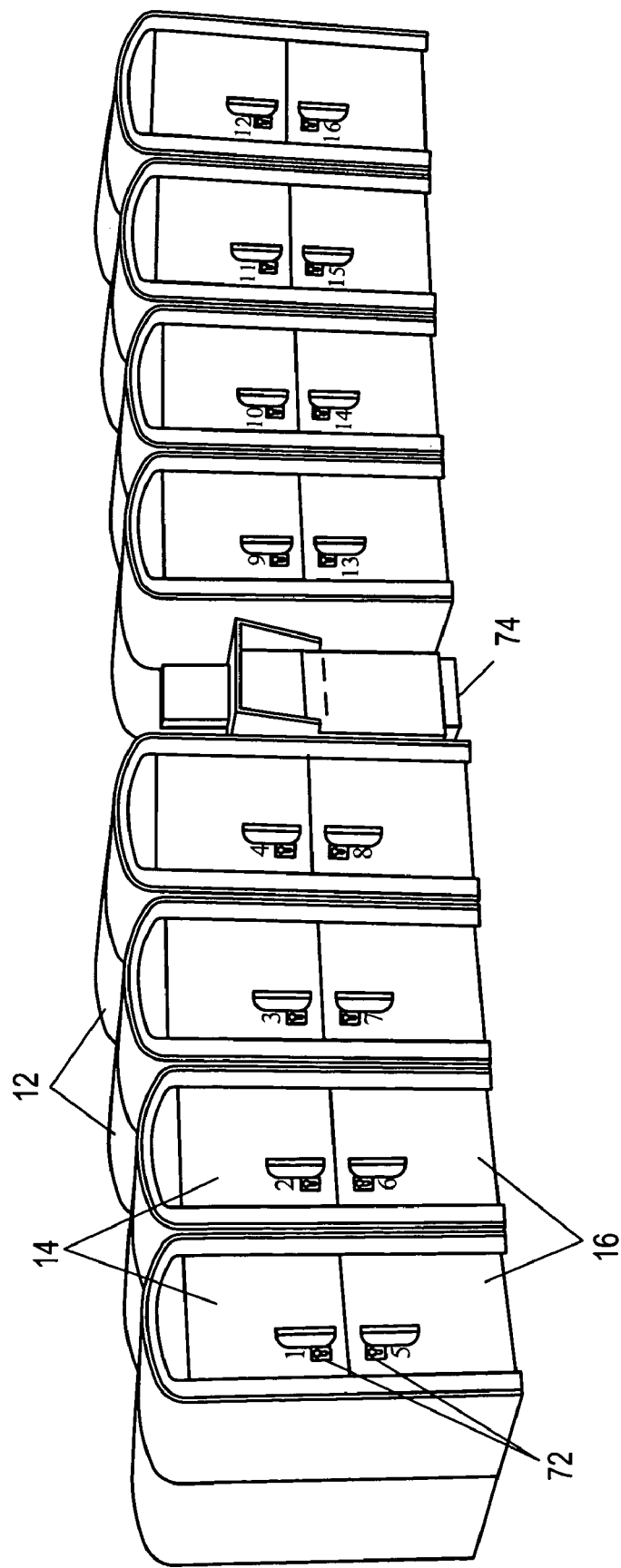
FIGS. 6-9 show various examples of the Bilevel Bicycle Storage System in use, according to the present invention.

The lower part of the upper receiver 20, which has a generally box-shaped profile, has upper and lower guide rails 42 which project inwards as presented in FIG. 6. These guide rails 42 form a track for the rear guide roller 38 and the front guide roller 34, which each have a circumferential groove for receiving the guide rails 42 to guide the upper receiver parallel to the mounting frame 28. When the upper receiver 20 is moved between its loading and unloading position and its storing position, it travels on the guide rollers 34, 38 and the guide rails 42. If the upper receiver 20 has a generally closed profile, elongated slots in the side of the upper receiver 20 will provide for the movement between the upper receiver 20 and the guide rollers 34, 38. The tension pulley axle 32 and the guide roller axle 40 extend through these elongated slots.

In FIG. 5, the pivot link 46 is shown in a horizontal position, parallel to the upper receiver 20. In this position, the pivot link 46 lies against the lower, horizontal section of a support bracket 68, so that the weight of the upper receiver 20, on which a bicycle could possibly be loaded, is supported not only by the tension pulley axle 32, the pivot shaft 48 and guide roller axles 34, 38, but also extensively by the support bracket 68 on the mounting frame 28.

FIG. 6 shows a line system of Doubleparkers, whereby the enclosures 12 have doors both above 14 and below 16, which are lockable using locks 72. This bicycle storing system can be operated by means of a terminal 74 set up among the enclosures 12.

The shown storing system or similar storing systems can be run fully automatically with few personnel. In such a system, the period of usage of each individual storing space is automatically registered, i.e. the elapsed time since the storing space was locked. The terminal or main controls attached to the terminal have a storage memory, which stores the time when every single storing space was locked, or if any storing spaces are not locked.

When a user wants to open a specific locked storing space, he must register at the terminal 74 first, identify the storing space and prove his right of access to the storing space. These three steps can be carried out by numerous actions, or just one single transaction, i.e. by using a key or access card or something similar, which the user can have checked at an appropriate reader or sensor at the terminal 74. The fee for use is dependent on the period of use for the identified storing space and can be displayed to the user at the terminal.

Payment of a fee for use can be made directly at the terminal or at one of the connected pay stations by using coins, bills or tokens or by cashless payments using debit or credit cards, or by providing account data and an ID-code. A data transfer from the terminal to a bank or other organization can be carried out depending on the required method of payment. This may be accomplished through a wired or wireless system. After payment is accepted, the appropriate storing space is automatically unlocked so that the user can open the door or the locking device of this storing space and remove his bicycle from the storing space.

A cabled or wireless data transfer from the terminal 74 to the main controls is provided via a telephone line or wireless communication system. The main controls can be a great distance away from a storing system—even hundreds of miles away. In this manner it is possible to run numerous storing systems from a collective main control system with few personnel. Technical information can be evaluated in the main control system, i.e. all errors or defects registered by sensors, so that service personnel can be sent to the storing system to repair and eliminate the defect or error. Sensory-detected information can also be stored and evaluated for business management reasons, i.e. it can be determined if any storing space is empty or if a bicycle is secured in the storing system, so that the utilization of the storing system can be evaluated for business management reasons. Invoices can also be drawn up in the main control system and sent to users, when, for example, long-term customers who do not need to pay directly at the terminal 74, but are billed at regular intervals, i.e. monthly.

Figure 7:
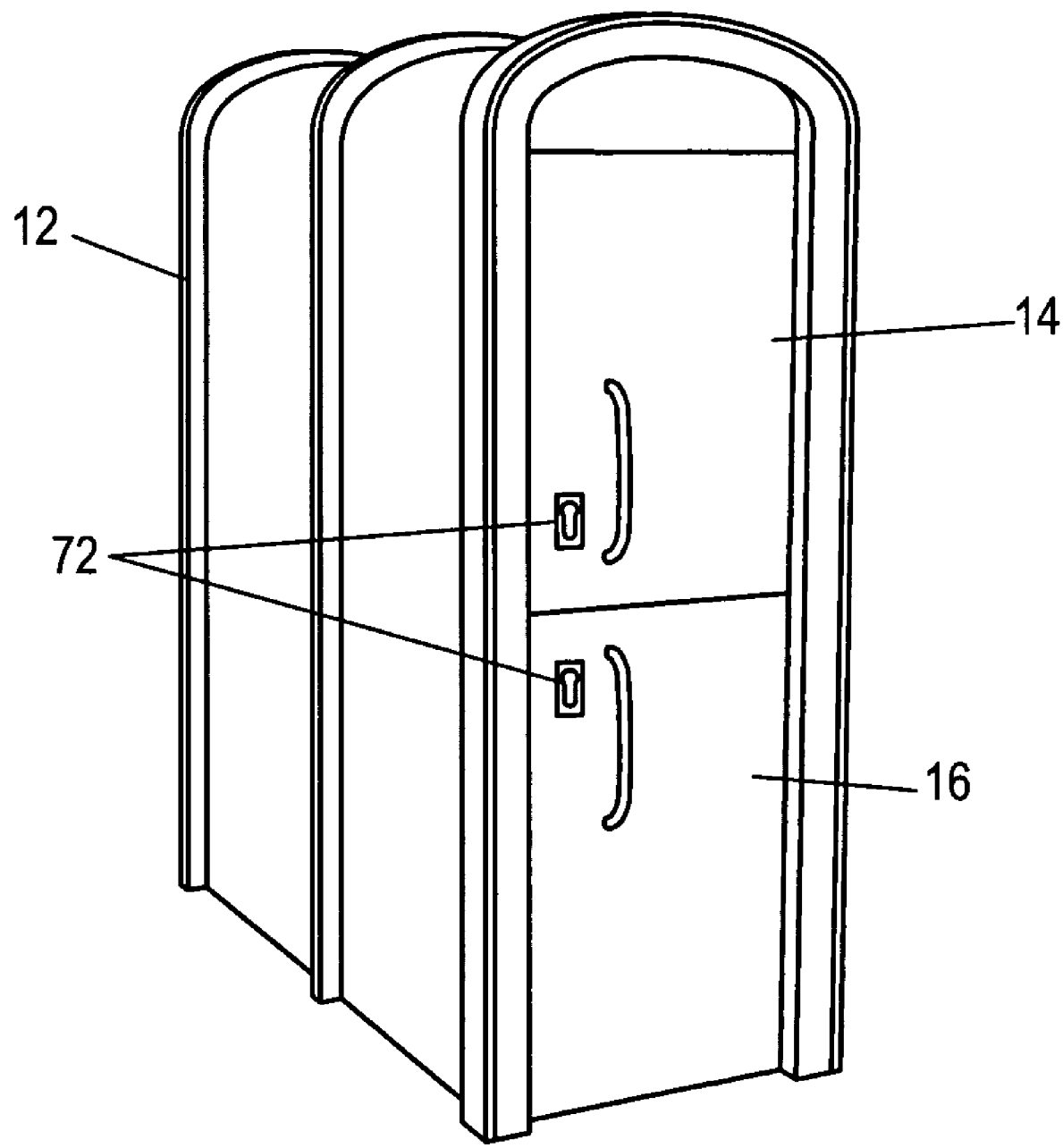

FIG. 7 shows a closer view of a single Doubleparker, where both doors 14, 16 are closed.

Figure 8:
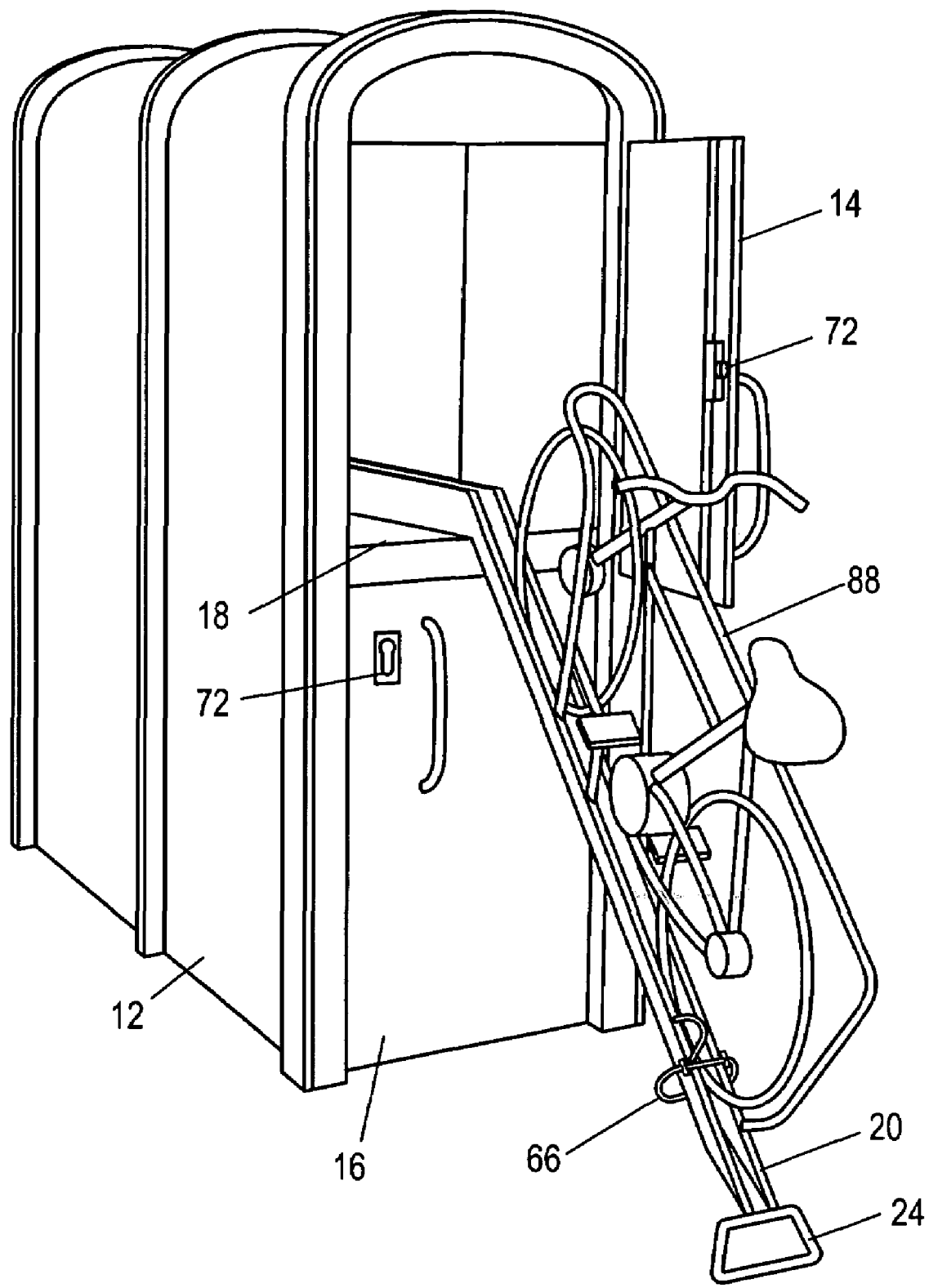

FIG. 8 shows a Doubleparker during the loading or unloading of the upper storing space. The wheel bail 60 and further details of the upper receiver 20 are not presented in this figure. A lean-against bracket 88 and clamps 78 are shown as an alternative to the wheel bail 60 and flanks 66. The lean-against bracket 88 is made of round pipe or tubing. In the preferred embodiment, the bracket 88 includes a protective cover made of a soft material, like PVC, in order to prevent damage to the bicycle frame. The bracket 88 aids in the security of the bicycle during loading, unloading and in the parking position. The leaning bracket 88 extends the entire length of the upper receiver 20 so that standard commercially-purchased chains or U-locks can be used to attach the bicycle to the bracket 88 in a number of user-defined positions. The lean-against bracket 88 is designed in such a way that the bicycle can be pushed into the upper or lower receiver until it is stable.

Figure 9:
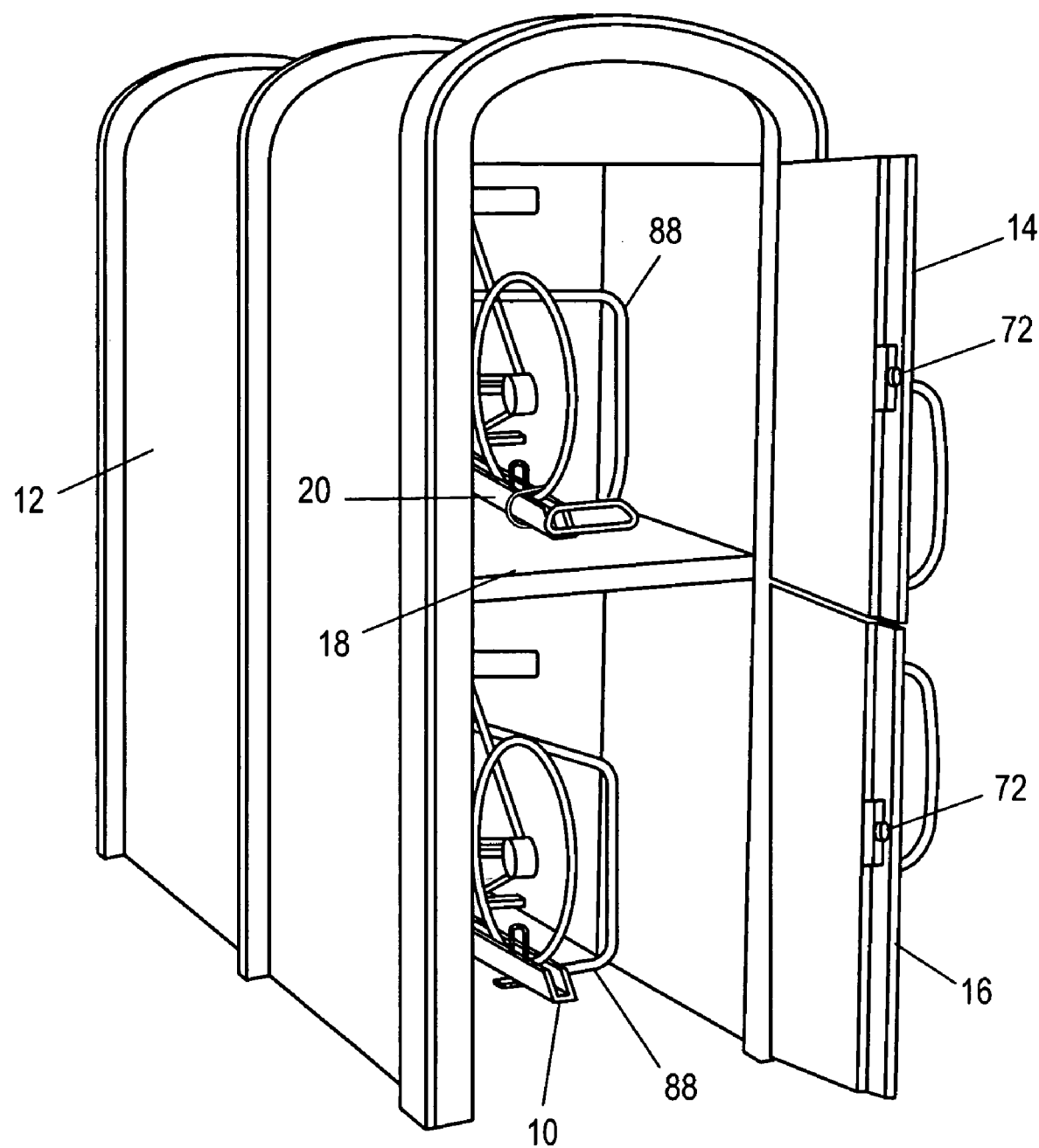

FIG. 9 shows a Doubleparker with two open doors, whereby both bicycles are shown in their storing position. The floor 18 is visible immediately below the upper receiver 20. The enclosure 12 may be clad or covered with a wide variety of suitable materials based upon decorative or functional requirements. In another embodiment, the lower storing space can be constructed so that the door 16 is curved or bent inward above its center, and with a matching profile on the enclosure 12, so that the top of the door 16 goes beneath the interior of the upper storing space. In this embodiment the pivot point near the proximal end of the mounting frame 28 is at the front edge of the enclosure 12. Any inward curve or bend in the front of the lower storing space would thus enable the upper receiver 20 to slant downward just above the bend, without interfering with the door 16 of the lower storing space.

In another embodiment, the upper receiver 20 is slidingly mounted to a guide bar 76. The guide bar 76 is slidingly mounted in turn to the mounting frame 28. The upper receiver 20 can be moved along the guide bar 76 so that the upper receiver 20 and the bicycle can be telescoped into the guide bar 76 and the guide bar 76 telescoped into the mounting frame 28. A much shorter overall length of the mounting frame 28 and the upper receiver 20 may be employed by telescoping them together. Minimal space is required for storing a bicycle in such a system.

The telescoping feature of the upper receiver 20 within the guide bar 76 allows for the upper receiver 20 to lower earlier as it is pulled out of the enclosure 12. It is not necessary to pull out the entire upper receiver 20 from the enclosure 12 and then lower the upper receiver 20 to the loading and unloading position only when the pivot point is near the leading edge of the enclosure. The telescoping feature of the guide bar 76 and the upper receiver 20 provides for easier handling of the upper receiver 20 and an early lowering of the upper receiver 20 so that easier handling is enabled for the customer when loading and unloading.

Figure 10:
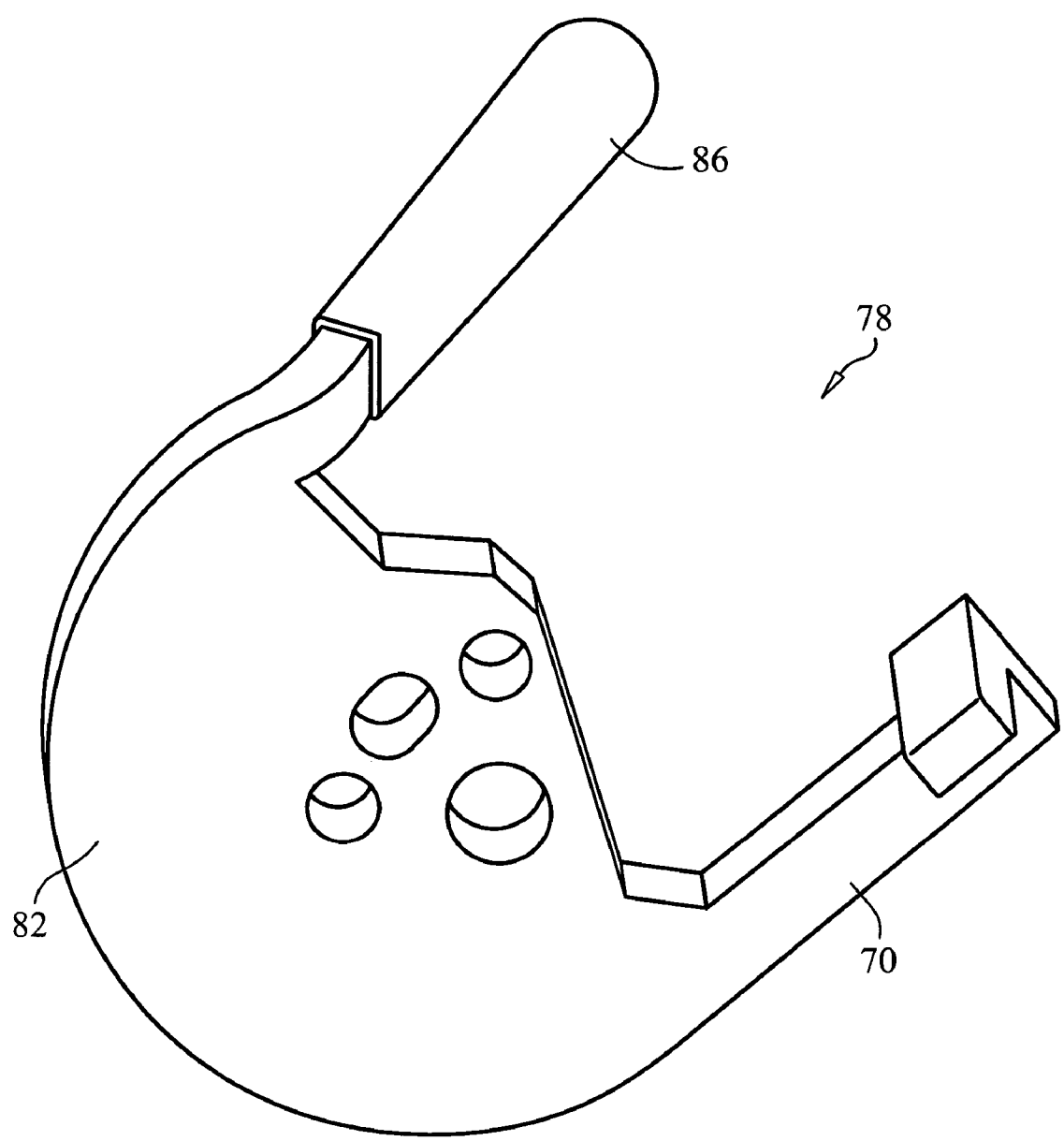
FIG. 10 shows a detailed view of a clamp arm for the Bilevel Bicycle Storage System, according to the present invention.
Figure 11:
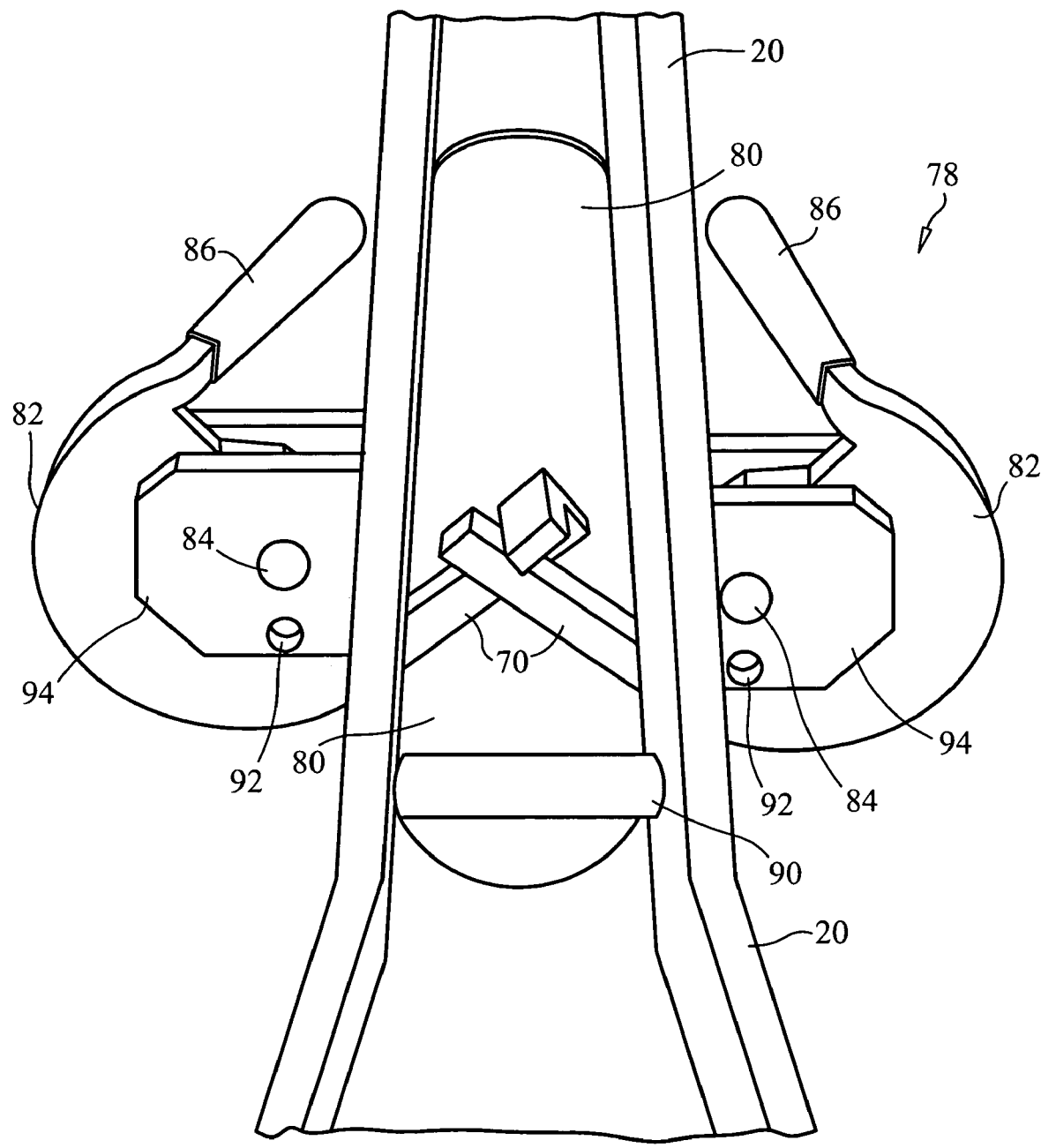
FIG. 11 shows a detailed view of the proximal end of the upper receiver for the Bilevel Bicycle Storage System, according to the present invention.
Figure 12:
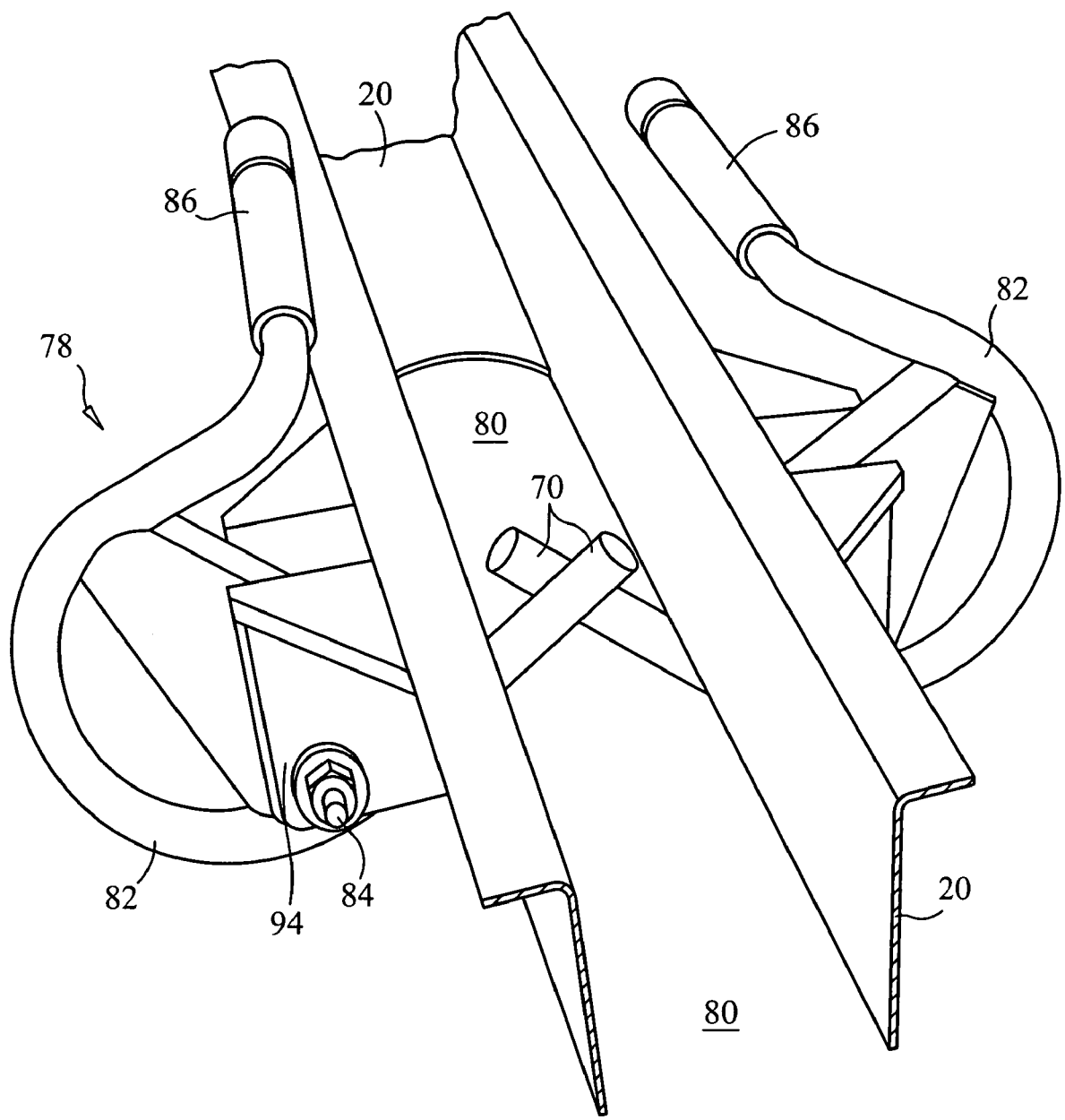
FIG. 12 a detailed view of an alternative embodiment of the proximal end of the upper receiver for the Bilevel Bicycle Storage System, according to the present invention.

FIGS. 10, 11 and 12 show a two-part bicycle retention clamp 78 that attaches to the receivers 10, 20. The clamp 78 uses the weight of the bicycle to secure the bicycle automatically, so that it cannot roll backward. The clamp 78 can be made of round stock, FIG. 12, or plate and sheet stock, FIGS. 10 and 11. Clamp 78 movement occurs as the bicycle enters the elongated hole 80 in the receiver 10, 20 due to its own weight. A pair of clamp arms 82 pivot about a pair of hinge points 84 outside the receiver 10, 20 on a pair of clamp mounts 94. A pair of actuator arms 70 overlap inside the elongated hole 80 so that the bicycle wheel acts upon the clamp arms 82 uniformly. A pair of clamp pads 86 bear against the bicycle wheel in response to the weight of the bicycle upon the actuator arms 70. The clamp 78 opens to release the wheel when the bicycle wheel is lifted out of the elongated hole 80 in the receiver 10, 20. Retention roller 90 may be employed to prevent shifting.

The clamp 78 can be used in all rail-like facilities in which the bicycle is pushed on or into the system. On the lower level, where a determination of the bicycle in the receiver is perhaps not necessary due to handling or security considerations, this locking device may still be provided for additional safety to hold the bicycles reliably. The clamp 78 may be incorporated into a security system to protect against theft. The clamp 78 can be devised as a mechanical self-locking device, so that the clamp automatically goes from open to locked when a bicycle is pushed into the storing system. A simple mechanical lock may be used with the lock apertures 92 on each clamp arm 82.

The clamp 78 can be controlled using appropriate sensors as well. As soon as the bicycle is in the "parking position" the bicycle is automatically locked. Additional sensors monitor the parking time and user identification by means of software, hardware and clock timers. The clamp 78 can be opened again by means of payment or other arrangement.

Figure 13:
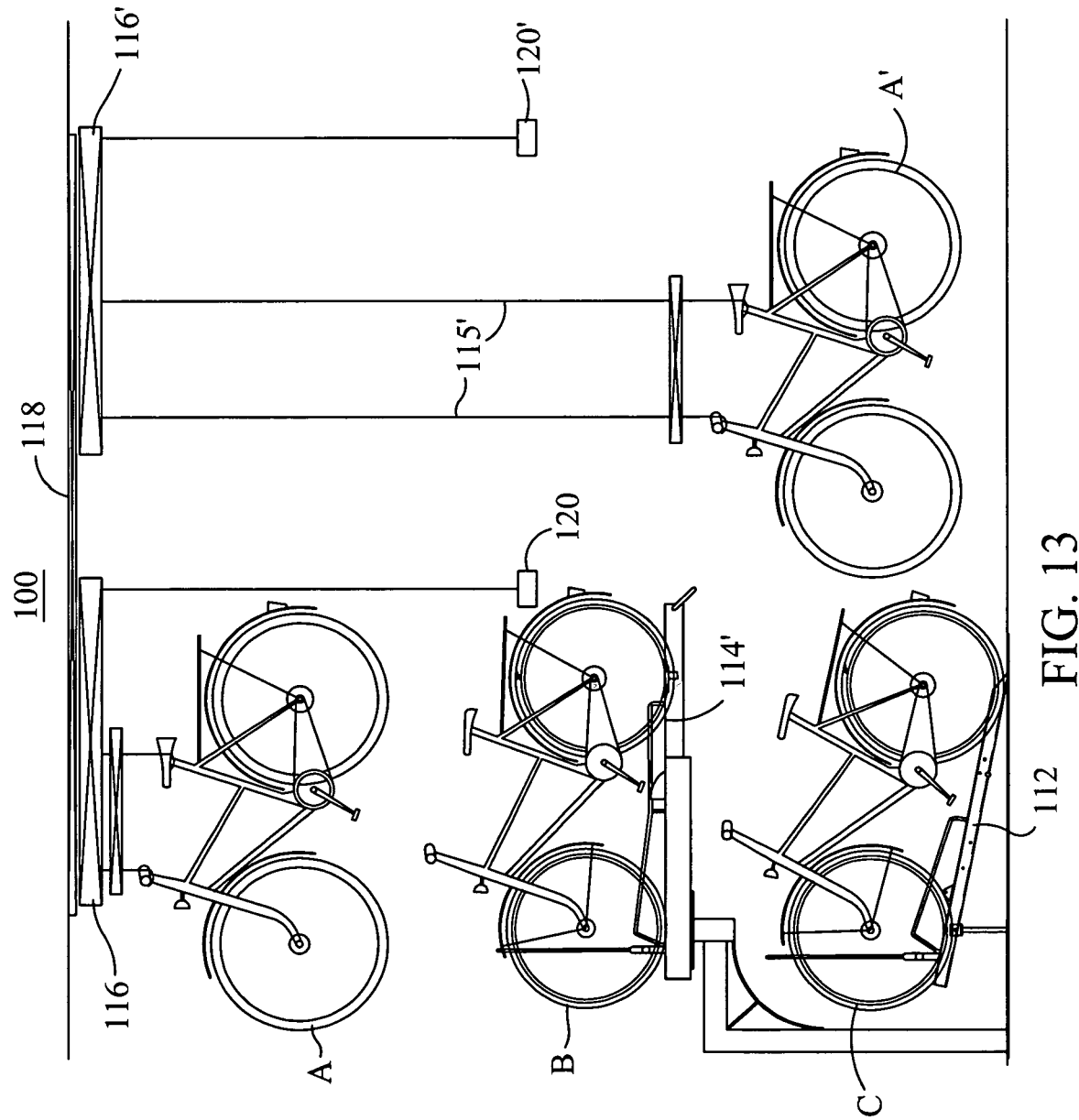
FIG. 13 shows a side view of a three-level bicycle parking system, according to the present invention.

FIG. 13 shows a side view of a three-level bicycle parking system, here in referred to as the TripleParker 100. Three bikes A,B,C are shown mounted on the TripleParker system 100. The bike C at the lowest level is easily rolled onto the lower rack 112 via a process that is described above. Bicycle B, in the middle level, is supported on an extendable rack 114 that also deflects downward for easy loading and unloading of bike B. Bicycle A is suspended above bikes B and C by a pair of cables 115 that are attached to a shuttle 116.

The shuttle 116 travels along a track mechanism 118 that is attached to the ceiling or another support. Shuttle 116' is the same shuttle as shuttle 116, but is shown at the opposite end of track 118 and ready to load or unload bicycle A'. Bicycle A' is also the same as bicycle A.

A control box 120, 120' is shown suspended from shuttle 116, 116' to control the position of the shuttle 116, 116' along track 118. The control box 120, 120' also controls the cables 115, 115' that lift and lower the bicycle A, A'. The control system may be set up to permit the cables 115 to be lowered only when the shuttle 116 is in the position shown by shuttle 116'.

Figure 14:
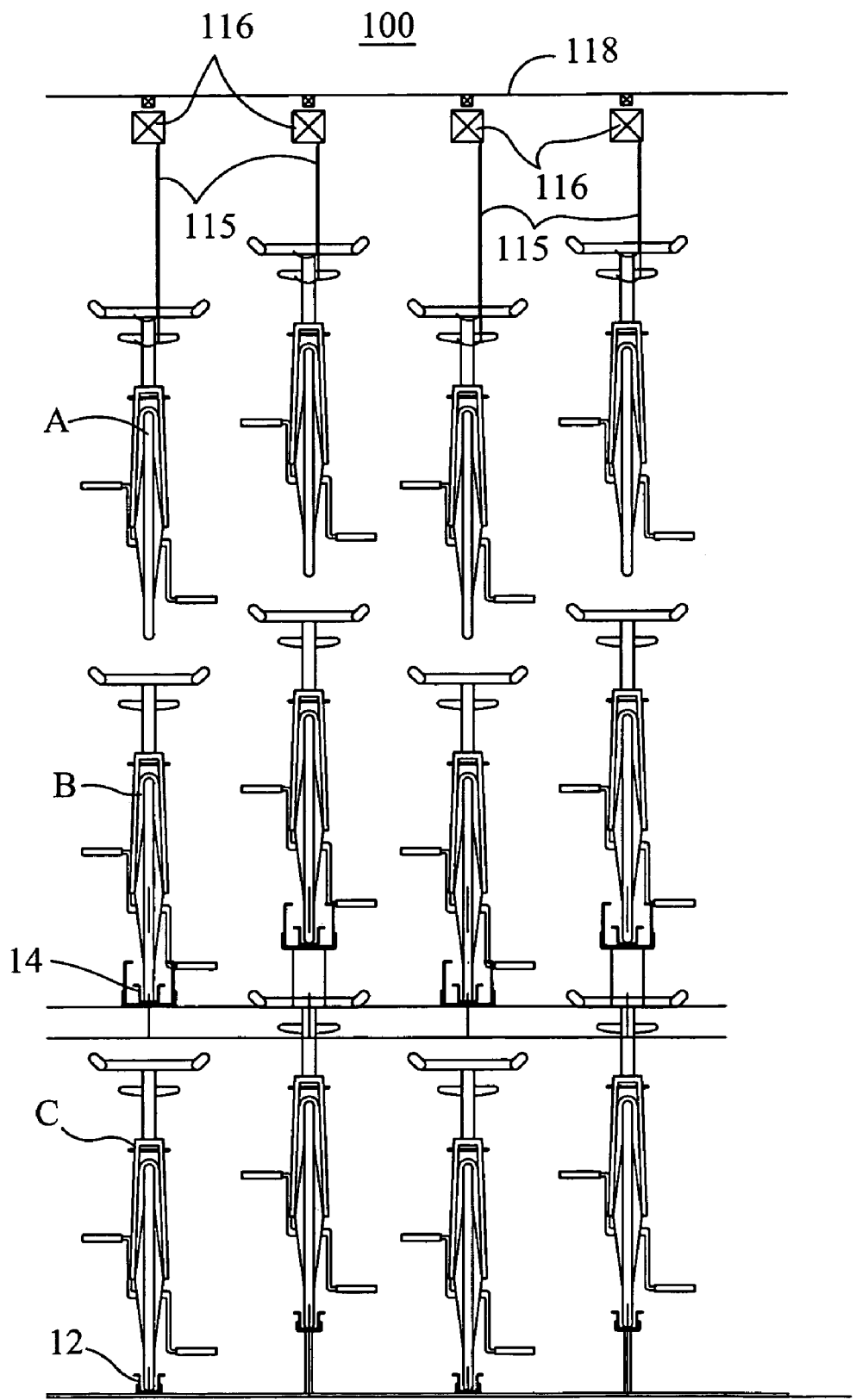
FIG. 14 shows a front view of the three-level bicycle parking system, according to the present invention.

FIG. 14 shows a front view of the TripleParker 100. Notice that the bicycles C and B, in the first level 112 and the second level 114, may be staggered in elevation to eliminate the possibility of handlebars becoming entangled. The mounting positions 112, 114 are assembled to incorporate this elevation stagger through minor manufacturing variances.

Figure 15:
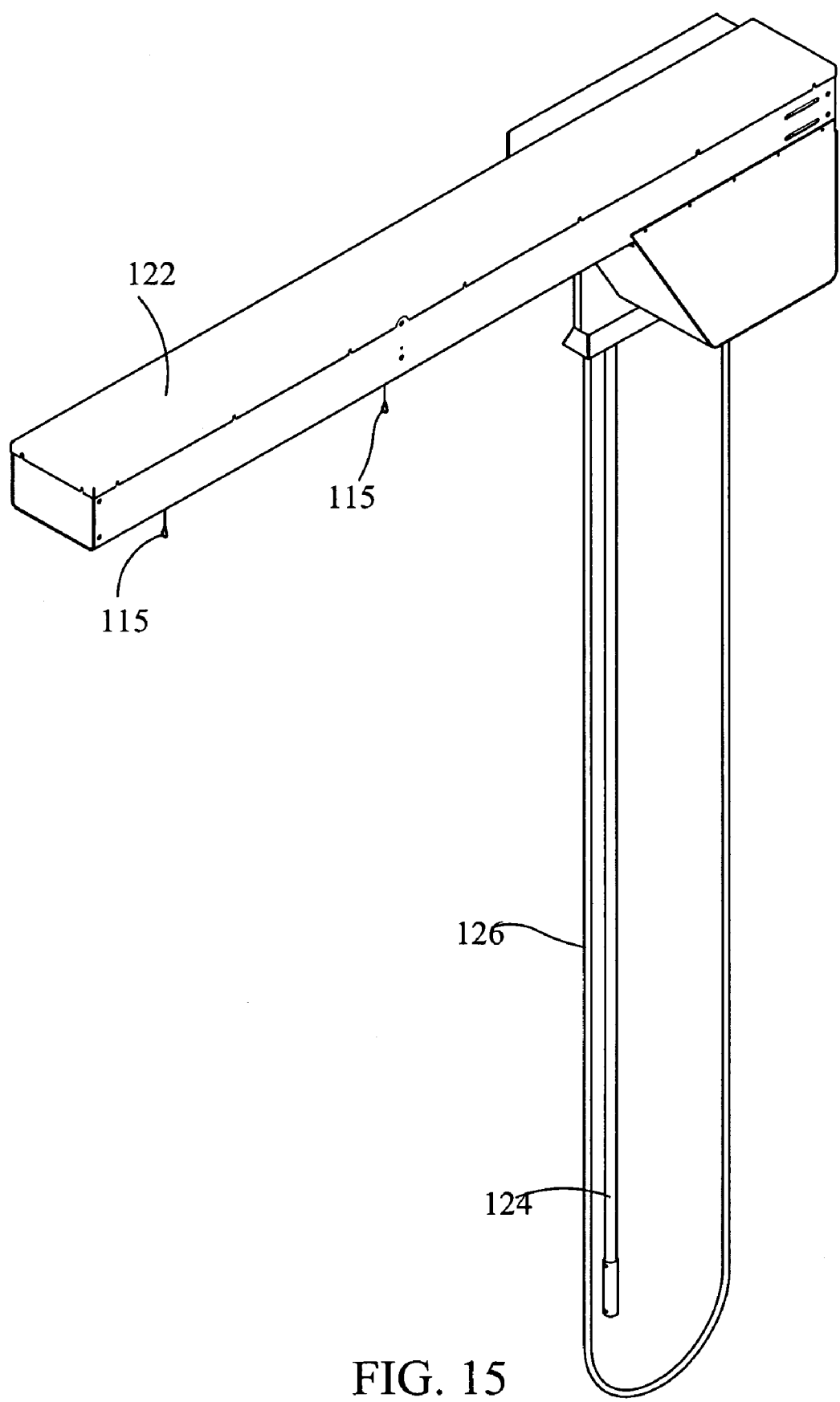
FIG. 15 is an elevated perspective view of the lift mechanism for the upper level of the three-level bicycle parking system, according to the present invention.

FIG. 15 is an elevated perspective view of the lift mechanism for the upper level of the TripleParker system 100. The track 118 is mounted within a housing 122 to shield the track mechanism 118 and to provide a simplified means to mount the track overhead. In the embodiment shown, the control box 120 is replaced with a control handle 124 and loop 126. The control handle 124 is manipulated by pulling or twisting to direct the shuttle 16 along the track 118. Motion of the shuttle 116 can be powered via an electric motor or similar means. The loop 126 is attached to an enclosed gear-reduction mechanism to raise and lower the cable 115 and any attached bicycle A.

Figure 16:
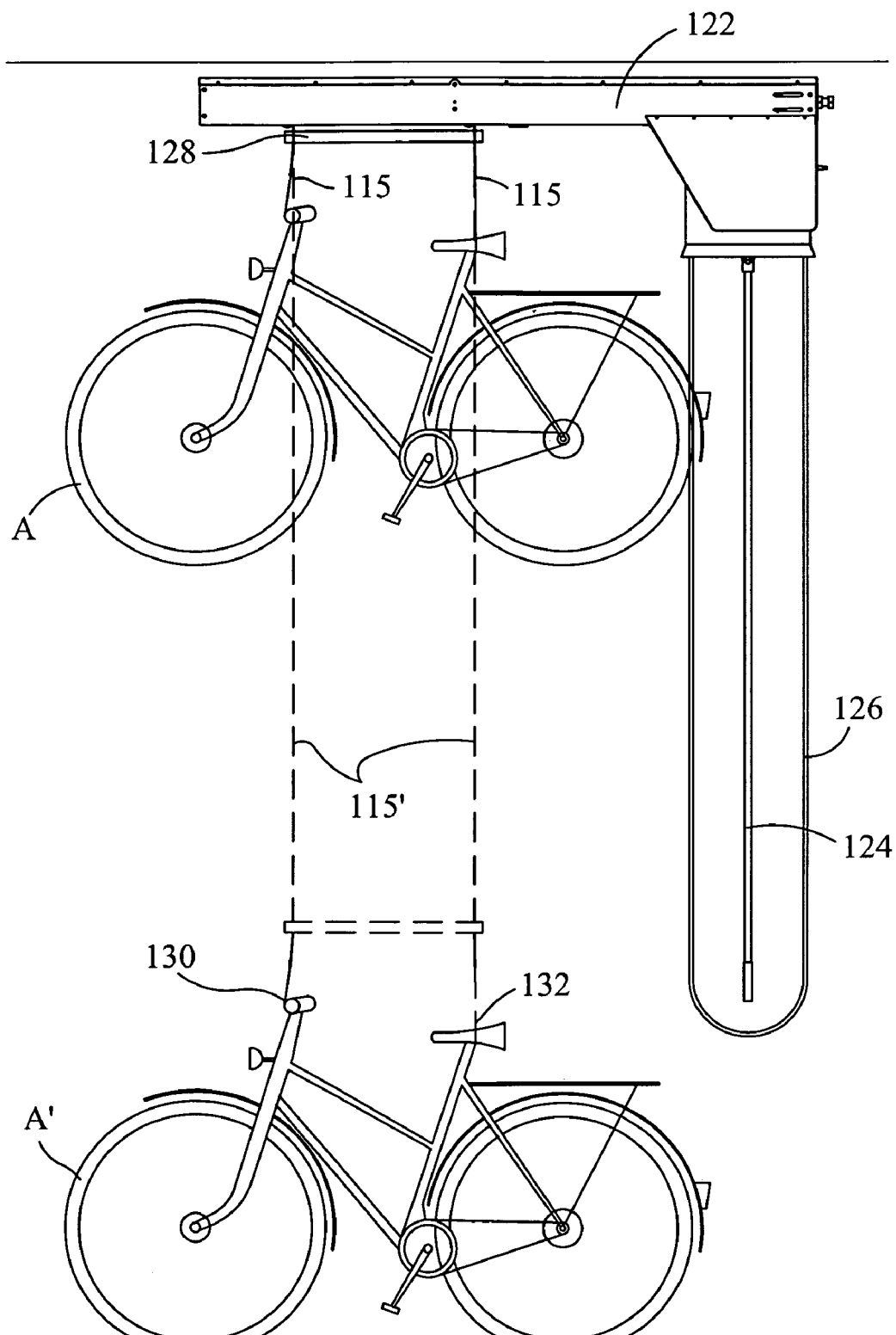
FIG. 16 is a side view of the lift mechanism for the upper level of the three-level bicycle parking system, according to the present invention.

FIG. 16 is a side view of the lift mechanism for the upper level of the TripleParker system 100. The housing 122 in this embodiment enclosed the shuttle 116, but the cables 115 are seen extending downward from the concealed shuttle 116. In this view the track 118 and housing 122 are slightly shortened for illustration purposes. A cable spacer 128 is attached to the cables 115 and keeps them properly separated and weighted to assure proper functioning, even without the weight of a bicycle A, and also prevents tangling of the cables 115. A handlebar hook 130 and a seat hook 132 are attached to the cables 115 and make it very easy to quickly attach a bicycle A.

Figure 17:
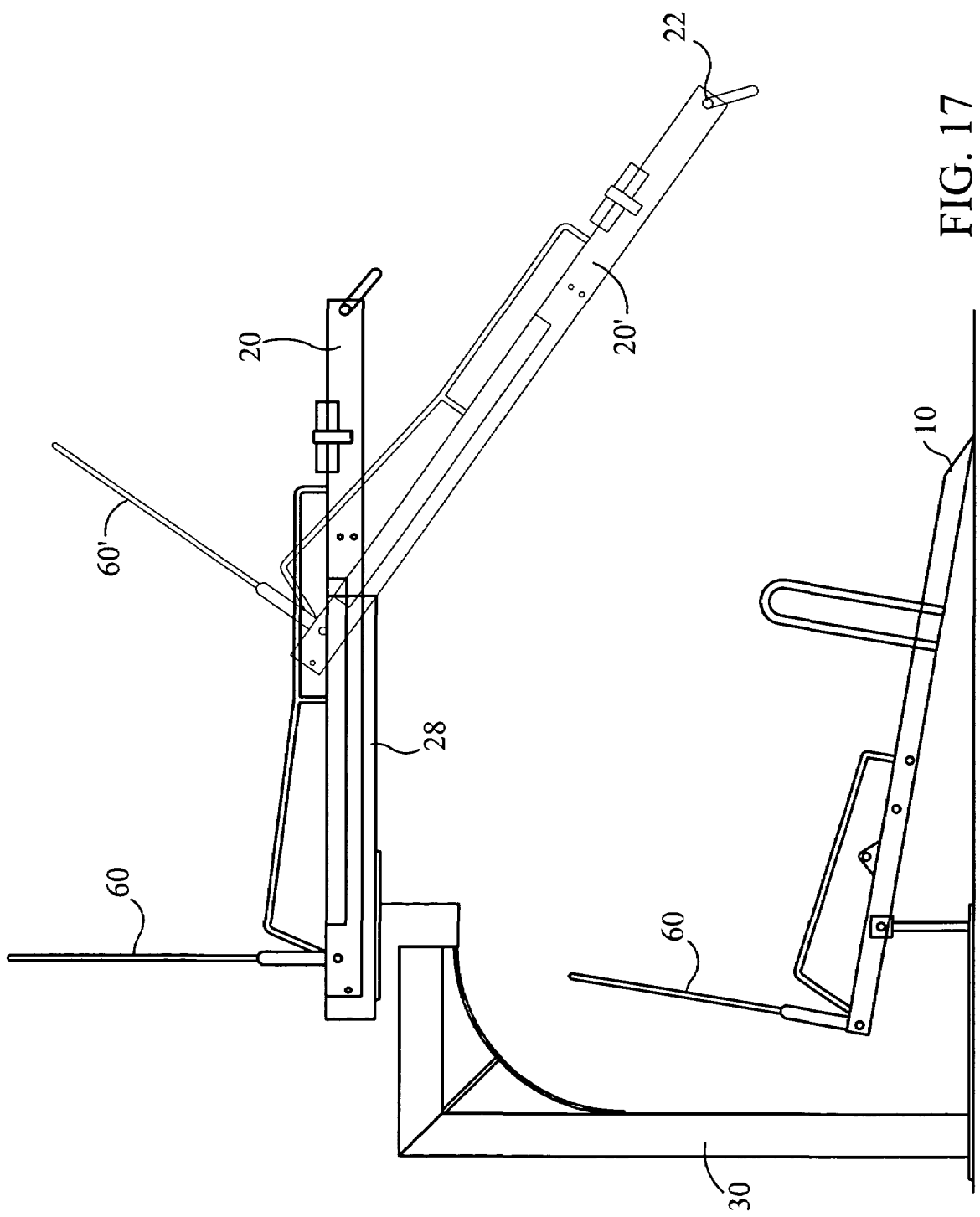
FIG. 17 is a side view of an alternative embodiment of the second level of the three-level bicycle parking system, according to the present invention.

FIG. 17 is a side view of an alternative embodiment of the second level of the TripleParker 100. This is mechanism is distinct in several ways from that described in FIG. 1 above. This embodiment still uses the vertical support 30 and the mounting frame 28 as seen in FIG. 1, but the upper receiver 20 is mounted to the mounting frame 28 using an entirely different mechanism. This mounting mechanism, shown in FIG. 18, enables the upper receiver 20 to be extended along and parallel to the mounting frame 28 for a predetermined distance at which point the proximal end 22 of the upper receiver 28 is deflected downward toward the floor. This enables easy loading and unloading of bicycles.

Figure 18:
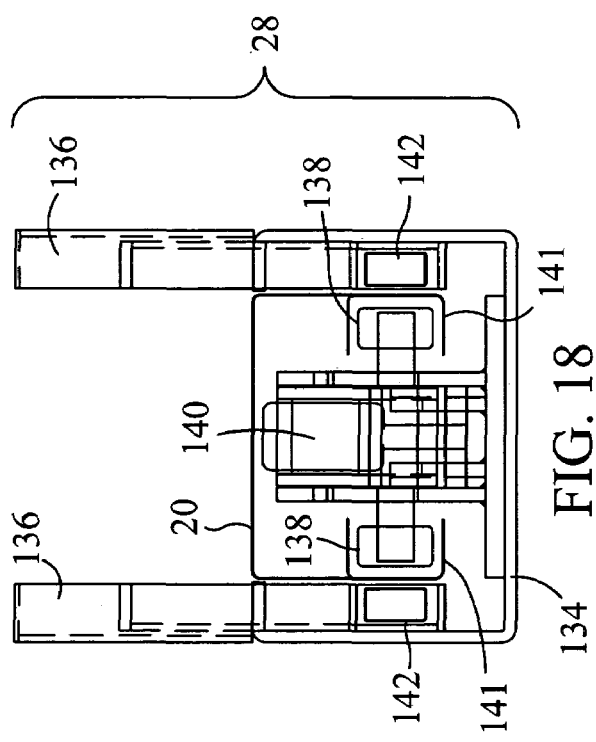
FIG. 18 is a front end view of the mounting frame for the second level of the three-level bicycle parking system, according to the present invention.

FIG. 18 is a front end view of the mounting frame 128. The mounting frame 28 includes a U-shaped channel 134, a pair of deflection rails 136, a pair of fulcrum rollers 138 and a support roller 140. The upper receiver 20, shown in cross-section in this view, includes an inverted-U channel that is parallel to the U-channel of the mounting frame 28 so as to conceal the fulcrum rollers 138 and support roller 140. The upper receiver 20 rides directly on the support roller 140 inside the top of the inverted-U. The upper receiver 20 also includes two pairs of parallel rails 141 which are also parallel to the length of the upper receiver 20, which envelope the fulcrum rollers 138, thereby providing three points of support for the movable upper receiver 20 assembly.

Figure 19:
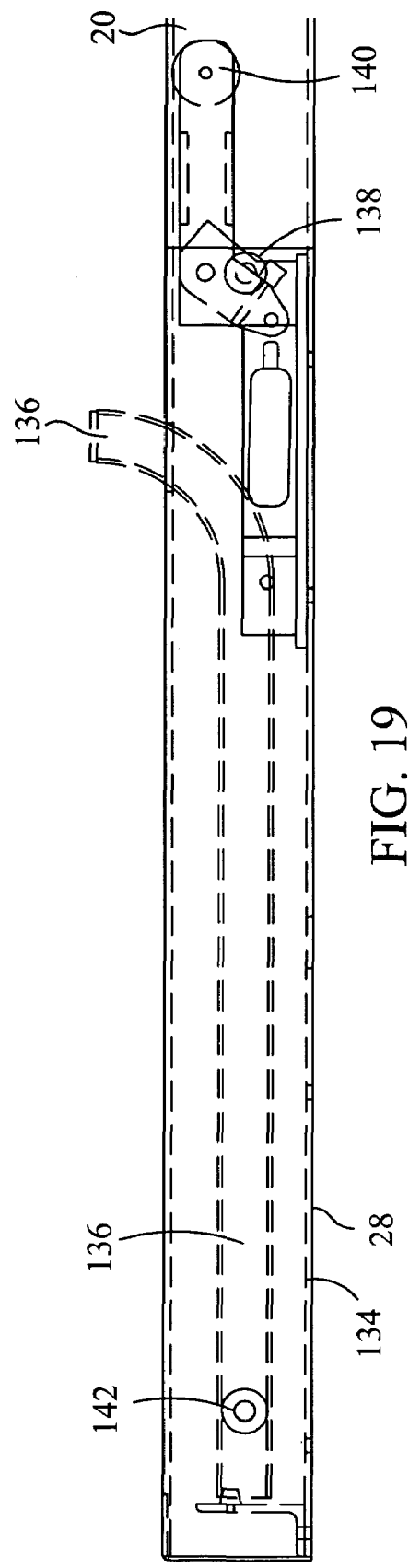
FIG. 19 is a side view of the mounting frame for the second level of the three-level bicycle parking system, according to the present invention.

FIG. 19 is a side view of the mounting frame 128. The deflection rails 136 are parallel to the length of the upper receiver 28 except near the fulcrum rollers 138, where the deflection rails 136 curve smoothly upward. The upper receiver 20 is in the retracted position, which is evident because the upper receiver 20 is level and parallel to the mounting frame 28, and the deflection roller 142, which is attached to one end of the upper receiver 20 is at the distal end of the deflection rails 136.

Figure 20:
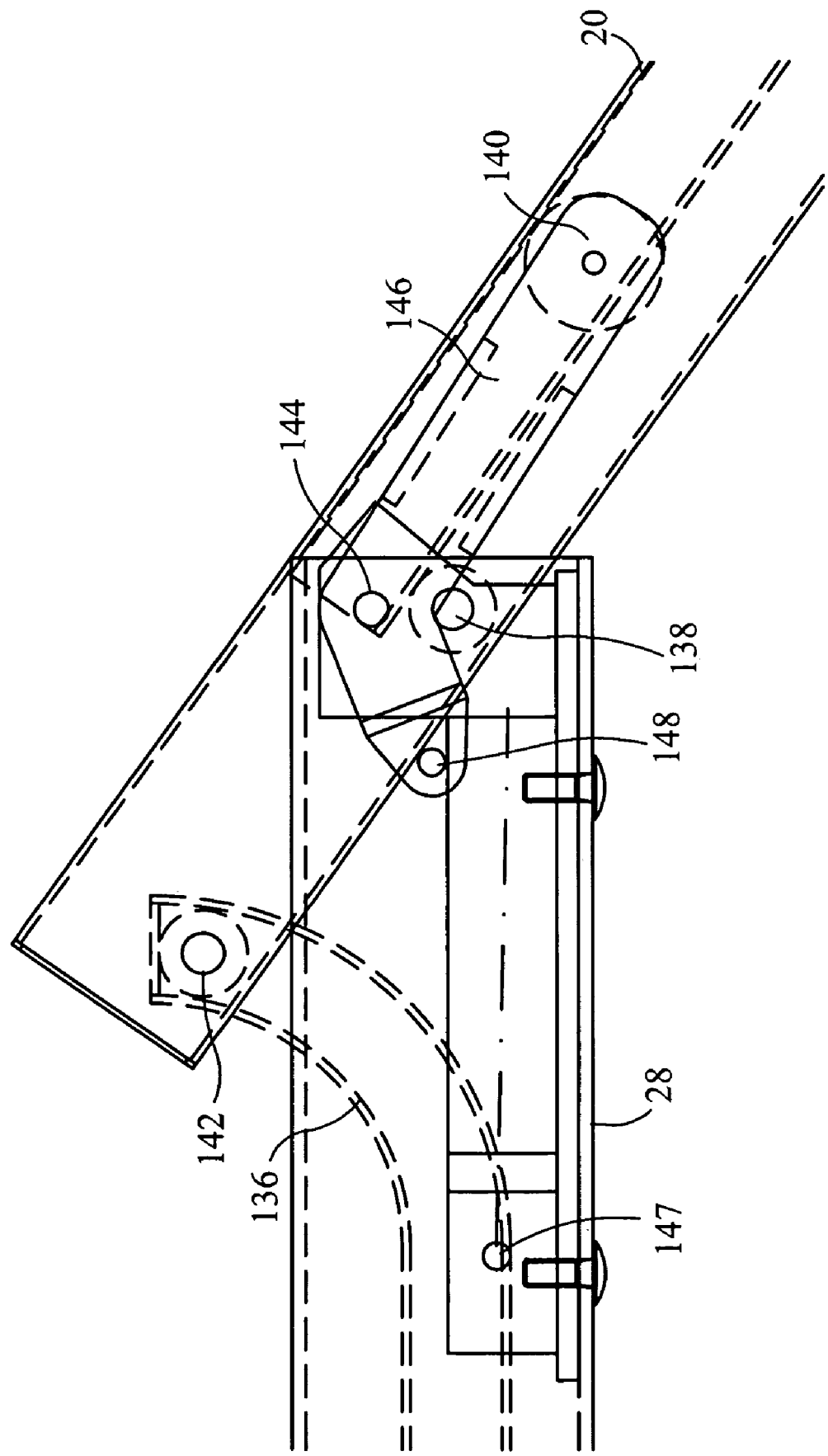
FIG. 20 is a view through the assembled mounting frame and upper receiver for the second level of the three-level bicycle parking system, according to the present invention.

FIG. 20 is a view through the assembled mounting frame 28 with the upper receiver 20 attached. In this view the upper receiver 20 is extended and deflected downward. The upper receiver 20 is easily extended and rolls on the deflection roller 142, the fulcrum rollers 138 and the support roller 140. As the upper receiver 20 is extended to a predetermined position, the deflection roller 142 encounters the upwardly curved portion of the deflection rails 136, which forces the distal end of the upper receiver 20 upward. The support roller 140 is mounted to a deflection lever 146 which is attached to the mounting frame 28 via a fulcrum bolt 144. The deflection lever 146 rotates to accommodate the upward deflection of the distal end of the upper receiver 20, thus, the support roller 140 is deflected downward along with the proximal end of the upper receiver 20. This is exemplified in FIG. 17 as upper receiver 20'.

Some resistance should be provided to prevent the upper receiver 20 from falling in an uncontrolled manner towards its extended and deflected position. For this purpose a gas spring (not shown) is mounted between spring mounts 147 and 148. Spring mount 147 is anchored to a fixed position inside the mounting frame 28. Spring mount 148 is attached to the deflection lever 146 opposite from the support roller 140. As the upper receiver 20 is deflected downward, the deflection lever 146 is rotated so that the spring mount 148 is moved away from spring mount 147. The gas spring acts to resist this movement and provides a restorative force to the deflection lever 146, and thereby the upper receiver 20. The gas spring thus damps the motion of the upper receiver 20 and aids in returning the upper receiver 20 to its level and retracted position.

I claim:

1. An elevated bicycle storage system comprising:
   a framework attached to a floor of a structure, the framework including
      a vertical support; and
      a horizontal mounting frame attached to the vertical support;
   the framework defining a lower bicycle storing space, a middle bicycle storing space, and an upper bicycle storing space, wherein the lower bicycle storing space includes a lower receiver, and the middle bicycle storing space includes an upper receiver, the upper receiver being pivotally mounted to the horizontal mounting frame with a pivot mechanism, the upper receiver being adapted to be extended from a horizontal storing position and pivoted down into a loading and unloading position, and retracted to the storing position, wherein the pivot mechanism further comprises
      a pair of fulcrum rollers rotatably attached to the mounting frame;
      a pair of deflection rails incorporated into the mounting frame, the deflection rails being generally horizontal at a distal end and curving upward at a proximal end;
      a deflection lever pivotally attached via a fulcrum bolt to the mounting frame, the lever further comprising a deflection roller at a proximal end and a first gas spring mount at a distal end;

a second gas spring mount fixed inside the mounting frame adjacent to the deflection lever, where the upper receiver comprises
    an inverted-U channel having a pair of parallel rails oriented horizontally inside the lower edge of the inverted-U channel and capturing the fulcrum rollers;
    a pair of deflection rollers mounted outside the lower edge of the inverted-U channel and inside the deflection rails; and
a gas spring attached to both of the gas spring mounts;
an upper track comprising a horizontal rail;
a shuttle movably engaging the rail;
a cable winch incorporated into the shuttle;
a bicycle support attached to the cable winch;
an electric winch motor attached to the cable winch and a power source;
an electric shuttle motor attached to the rail and the shuttle and the power source;
a control box attached between the winch motor, the shuttle motor and the power source;
an electric shuttle motor attached to the shuttle, the rail and a power source;
a control handle linked to the shuttle motor; and
a control loop attached to the cable winch via a reduction gear assembly.

2. an elevated bicycle storage system comprising:
a framework attached to a floor of a structure, the framework comprising
    a vertical support; and
    a horizontal mounting frame attached to the vertical support;
the framework defining a lower bicycle storing space, a middle bicycle storing space, and an upper bicycle storing space, whereby the lower bicycle storing space includes a lower receiver and the middle bicycle storing space includes an upper receiver, the upper receiver being pivotally mounted to the horizontal mounting frame with a pivot mechanism;
a pair of fulcrum rollers rotatably attached to the mounting frame;
a pair of deflection rails incorporated into the mounting frame, the deflection rails being generally horizontal at a distal end and curving upward at a proximal end;
a deflection lever pivotally attached via fulcrum bolt to the mounting frame, the lever further comprising a deflection roller at a proximal end and a first gas spring mount at a distal end;
a second gas spring mount fixed inside the mounting frame adjacent to the deflection lever, where the upper receiver comprises
    an inverted-U channel having a pair of parallel rails oriented horizontally inside the lower edge of the inverted-U channel and capturing the fulcrum rollers;
    a pair of deflection rollers mounted outside the lower edge of the inverted-U channel and inside the deflection rails;
a gas spring attached to both of the gas spring mounts;
an upper track comprising a horizontal rail;
a shuttle movably engaging the rail;
an electric shuttle motor attached to the rail and the shuttle and a power source;
a cable winch incorporated into the shuttle;
an electric winch motor attached to the cable winch and the power source;
a control box attached between the winch motor, the shuttle motor and the power source; and
a bicycle support attached to the cable winch.

* * * * *